UNITED STATES PATENT OFFICE.

JOSEPH KOETSCHET, OF LYON, FRANCE, ASSIGNOR TO SOCIETE CHIMIQUE DES USINES DU RHONE, OF PARIS, FRANCE.

MANUFACTURE OF CELLULOSE ACETATE.

1,258,913. Specification of Letters Patent. Patented Mar. 12, 1918.

No Drawing. Application filed June 18, 1914. Serial No. 845,856.

*To all whom it may concern:*

Be it known that I, JOSEPH KOETSCHET, of 24 Quai Claude Bernard, Lyon, France, have invented certain new and useful Improvements in or Relating to the Manufacture of Cellulose Acetate, of which the following is a specification.

The present invention has for its subject a process for the manufacture of new acetates of cellulose.

Acetates of cellulose are generally obtained by the action of acetic anhydrid on cellulose which in some cases is subjected to a preliminary or preparatory treatment.

It has been found by experiments which led to the present invention, that the course or effect of the acetylation and the properties of the acetate obtained are determined to a very great extent by the character of the preliminary treatment.

Hitherto, this operation has consisted in a treatment with an acid (generally sulfuric acid), more or less diluted with glacial acetic acid.

In this method a relatively high temperature was necessary the effect of which was to cause an extensive alteration of the cellulose molecule.

Now we have found that the modification or alteration of the cellulose, so far as this is necessary, can be effected at a much lower temperature by subjecting the cellulose to a preliminary treatment with glacial acetic acid together with 1 to 20 per cent. of acetic anhydrid and with a condensing agent. By this treatment the cellulose is converted into a fluid mass and new conversion products of cellulose are obtained which give new and very valuable acetates on acetylation. The conversion products and also the acetates are above all very homogeneous, which is only the case to a slight degree with most of the known products. This homogeneity is shown by the fact that the acetates produced according to the present invention dissolve completely in suitable solvents; these solutions are perfectly clear and nevertheless of great viscosity.

The quantity of anhydrid employed in this operation is of great effect upon the result. In any case it is much less than quantities which would be required for the acetylation; the anhydrid is diluted with glacial acetic acid, the contents of anhydrid may vary from 1% to 20% of the solution.

*Example.*

10 parts cellulose are introduced into
60 parts glacial acetic acid
4 parts acetic anhydrid
0.5 parts of sulfuric acid (100%)

The presence of sulfuric acid or other condensing agent is essential in this preliminary treatment.

The cellulose is rapidly attacked, loses its texture and gives an easily fluid mass with the acid mixture.

The temperature is maintained at about 30° C. for several hours and finally 21 parts of acetic anhydrid are added.

The acetylation takes place very quickly, and prepared cellulose dissolves rapidly and gives a clear solution of great viscosity.

By precipitating with water, an acetate is obtained which is distinguished from all products described in previous patent specification; it is insoluble in nitro-benzene, acetone, or ether, very slightly soluble in alcohol and readily soluble in chloroform.

If, instead of precipitating direct, one saponifies partially in the solution by known methods, new less acetylated esters are readily obtained, some of which are soluble in acetone.

What I claim and desire to secure by Letters Patent is:

1. A process for the manufacture of cellulose acetate, comprising converting the cellulose into a fluid mass by subjecting it to a preliminary treatment with glacial acetic acid together with 1 to 20 per cent. of acetic anhydrid, and with a condensing agent.

2. A process for the manufacture of cellulose acetate, comprising converting the cellulose into a fluid mass by subjecting it to a preliminary treatment with glacial acetic acid together with 1 to 20 per cent. of acetic anhydrid and with sulfuric acid.

3. A process for the manufacture of cellulose acetate, comprising converting the cellulose into a fluid mass by subjecting it to a preliminary treatment with glacial acetic acid together with 1 to 20 per cent. of acetic anhydrid and with a condensing agent, and acetylating the resulting product with a further quantity of acetylating agent.

4. A process for the manufacture of cellulose acetate, comprising converting the cellulose into a fluid mass by subjecting it to a preliminary treatment with glacial acetic acid together with 1 to 20 per cent. of acetic anhydrid and with sulfuric acid, and acetylating the resulting product with a further quantity of acetic anhydrid.

5. A process for the manufacture of cellulose acetate, comprising converting the cellulose into a fluid mass by subjecting it to a preliminary treatment with glacial acetic acid together with 1 to 20 per cent. of acetic anhydrid and with a condensing agent, acetylating the resulting product with a further quantity of acetylating agent, and precipitating the acetylated product.

6. A process for the manufacture of cellulose acetate, comprising converting the cellulose into a fluid mass by subjecting it to a preliminary treatment with glacial acetic acid together with 1 to 20 per cent. of acetic anhydrid and with a condensing agent, acetylating the resulting product with a further quantity of acetylating agent, and partially saponifying and precipitating the acetylated product.

7. A process for the manufacture of cellulose acetate, comprising converting the cellulose into a fluid mass by subjecting it to a preliminary treatment with glacial acetic acid together with 1 to 20 per cent. of acetic anhydrid and with sulfuric acid, acetylating the resulting product with a further quantity of acetic anhydrid, and partially saponifying and precipitating the acetylated product.

In testimony whereof I have signed my name to this specification in the presence of two subscribing witnesses.

JOSEPH KOETSCHET.

Witnesses:
JOHN J. ERNSTER,
MARIUS HERMAN.